United States Patent
Bold et al.

(10) Patent No.: US 8,635,468 B2
(45) Date of Patent: Jan. 21, 2014

(54) SLEEP WAKE EVENT LOGGING

(75) Inventors: Ethan Bold, San Francisco, CA (US); Joe Liu, Cupertino, CA (US); Jonathan Barbero, San Francisco, CA (US); Dean Reece, Foster City, CA (US)

(73) Assignee: Apple Inc., Cupertino, CA (US)

( * ) Notice: Subject to any disclaimer, the term of this patent is extended or adjusted under 35 U.S.C. 154(b) by 941 days.

(21) Appl. No.: 12/479,238

(22) Filed: Jun. 5, 2009

(65) Prior Publication Data
US 2010/0312946 A1 Dec. 9, 2010

(51) Int. Cl.
*G06F 1/32* (2006.01)
(52) U.S. Cl.
USPC .......................................................... 713/300
(58) Field of Classification Search
USPC .......................................................... 713/300
See application file for complete search history.

(56) References Cited

U.S. PATENT DOCUMENTS

| | | | | |
|---|---|---|---|---|
| 5,469,553 | A * | 11/1995 | Patrick ........................... | 713/323 |
| 7,072,813 | B2 * | 7/2006 | Billemaz et al. ................... | 703/6 |
| 7,188,171 | B2 * | 3/2007 | Srinivasan et al. ............. | 709/224 |
| 7,457,872 | B2 * | 11/2008 | Aton et al. ..................... | 709/224 |
| 7,904,757 | B2 * | 3/2011 | Niikkonen et al. .............. | 714/39 |
| 8,001,075 | B2 * | 8/2011 | Doty et al. ..................... | 707/609 |

* cited by examiner

*Primary Examiner* — Kim Huynh
*Assistant Examiner* — Eric Chang
(74) *Attorney, Agent, or Firm* — Blakely, Sokoloff, Taylor & Zafman LLP

(57) ABSTRACT

A machine implemented method includes creating a universally unique identifier, detecting a trigger of a sleep event, and associating the universally unique identifier with the sleep event. The method monitors sub-system events that occur after a sleep event has been triggered and stores data in non-volatile non-disk storage (e.g., non-boot storage) identifying an event stage corresponding to the sub-system event that is occurring. The method determines whether a wake event has completed and logs each of the sub-system events using the universally unique identifier until a wake event has completed.

20 Claims, 4 Drawing Sheets

SLEEP WAKE EVENT LOGGING

FIELD OF THE INVENTION

Embodiments of the invention relate to event logging, and more particularly to, logging events related to a sleep event and wake event.

BACKGROUND

Sleep mode (also referred to as Stand By, Sleep, Suspend) refers to a low power mode of operation for electronic devices (e.g., computers, televisions, etc.). Many battery-operated devices, such as notebook computers, support a sleep mode. Sleep mode can save significant electrical consumption compared to leaving a device fully on by powering down unnecessary components. For example, when a notebook computer goes into sleep mode, it shuts down the display screen and disk drive. Once awakened, the computer returns to its former operating status without a user having to reset programming codes or wait for a machine to reboot.

A computer may experience an error (e.g., a sequencing error) while the computer is entering sleep or exiting sleep such that the computer may experience a system failure, automatically shut down due to the error, and need to be rebooted. After a computer has been rebooted, however, there is no information to help determine a cause of the system failure. There is a lack of data to help debug a system failure which has occurred while a computer is entering or awakening from sleep. In addition, any data that may be available may not easily be identified as data related to a sleep event or wake event.

SUMMARY OF THE DESCRIPTION

A number of computer sub-systems perform a series of sub-system events when a computer system enters or awakens from sleep. For example, when a computer enters sleep, a network interface sub-system and device driver sub-system are notified that sleep has been initiated, and events occur to turn the network interfaces and device drivers off. Each sub-system generates a message for each event performed and each message is logged. The sub-system events can also be grouped into events stages. For example, events to notify the device driver sub-system of the initiated sleep mode and events to turn the device drivers off can be grouped into a device driver stage. In one embodiment described herein, a machine implemented method uses a universally unique identifier to correlate sub-system events to a particular sleep event and wake event and stores data identifying a sub-system event stage that is occurring. The method includes creating a universally unique identifier, detecting a trigger of a sleep event, and associating the identifier with the sleep event. The method monitors sub-system events that occur after a sleep event has been triggered and stores data in non-volatile non-disk storage (e.g., non-boot storage) identifying an event stage corresponding to the sub-system event that is occurring. The method determines whether a wake event has completed and logs each of the sub-system events using the identifier until a wake event has completed.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to one embodiment or an embodiment means that a particular feature, structure or characteristic described in connection with the embodiment is included in at least one embodiment of the invention. The appearance of the phrase "in one embodiment" in various places in the specification do not necessarily refer to the same embodiment.

Figure 1:
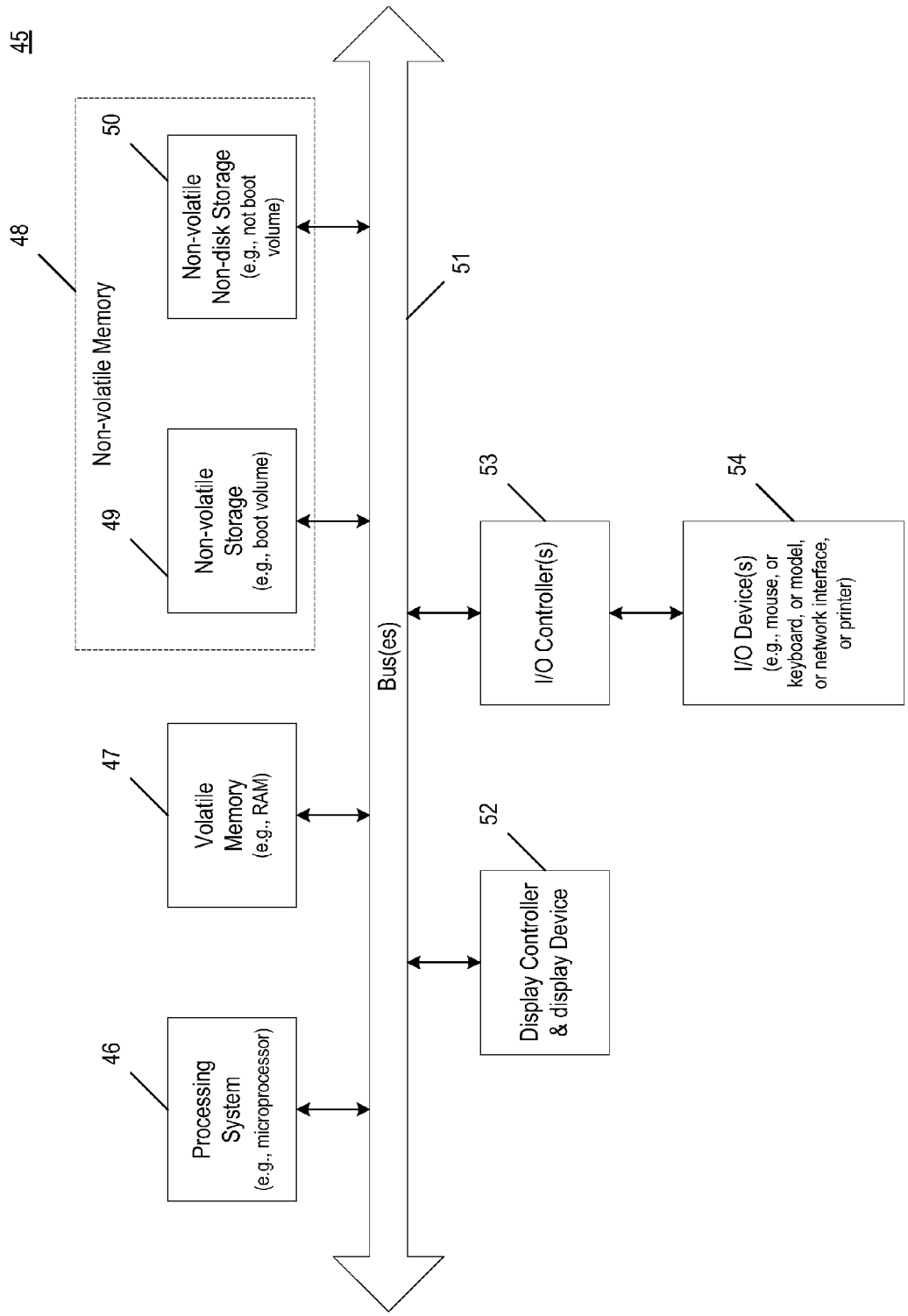
FIG. 1 shows an example of an event logging computer system, such as a computer.

FIG. 1 shows one example of a computer system which is a form of an event logging computer system 45. Note that while FIG. 1 illustrates various components of a computer system, it is not intended to represent any particular architecture or manner or interconnecting the components as such details are not germane to the present inventions. It will also be appreciated that personal digital assistants (PDAs), cellular telephones, media players (e.g., an iPod), devices which combine aspects or functions of these devices (a media player combined with a PDA and a cellular telephone in one device), network computers, an embedded processing device within another device, and other data processing systems which have fewer components or perhaps more components may also be used to implement one or more embodiments of the present inventions and may be one or more of the data processing system described herein. The computer system in FIG. 1 may, for example, be a Mac computer from Apple, Inc. or a computer which runs the Windows operating software from Microsoft Corporation.

As shown in FIG. 1, the computer system 45 includes a bus 51 which is coupled to one or more microprocessors which form a processing system 46. The bus 51 is also coupled to volatile memory 47 and to non-volatile memory 48. Volatile memory 47 can include random access memory (RAM). Non-volatile memory 48 can include non-volatile storage 49 (e.g., boot volume) and non-volatile non-disk storage 50 (e.g., non-boot volume). The microprocessor(s) 46 can retrieve instructions from the memories 47, 48 and execute the instructions to perform operations described below. The bus 51 is also coupled to a display controller and display device 52 and to peripheral devices such as one or more input/output (I/O) devices 54 which may be mice, keyboards, modems, network interfaces, printers and other devices which are well known in the art. Typically, the input/output devices 54 are coupled to the system through input/output controllers 53.

The volatile memory 47 is typically implemented as dynamic RAM (DRAM) which continually requires power in order to refresh or maintain the data in the memory. The non-volatile non-disk storage 50 can be implemented as, for example, CMOS, flash memory or any type of memory system that is not a boot volume and can maintain data even after power is removed from the system. The non-volatile storage 49 (e.g., boot volume) is typically a magnetic optical drive or an optical drive or a DVD RAM or other types of memory systems which maintain data (e.g., large amounts of data) even after power is removed from the system. Typically, the non-volatile storage 49 will also be a random access memory although this is not required. While FIG. 1 shows that the non-volatile storage 49 is a local device coupled directly to the rest of the components in the data processing system, it will be appreciated that the present invention may utilize a non-volatile storage which is remote from the system, such as a network storage device which is coupled to the data processing system through a network interface such as a modem, an Ethernet interface or a wireless network. The bus 51 may include one or more buses connected to each other through various bridges, controllers and/or adapters as is well known in the art. One of skill in the art will immediately recognize that the term "machine-readable storage medium" includes any type of volatile or non-volatile storage device that is accessible by a processor.

Figure 2:
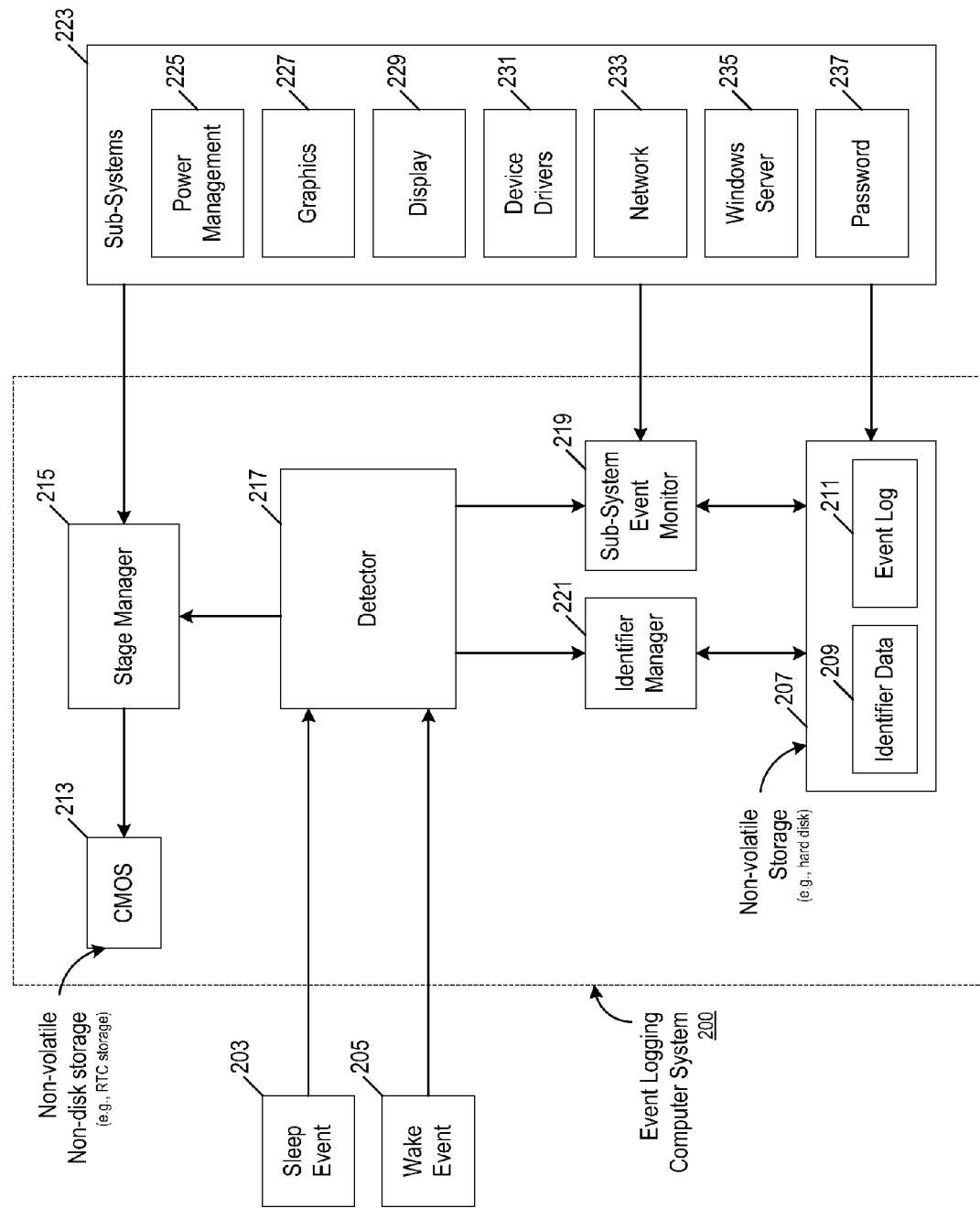
FIG. 2 shows an example of an event logging computer system in block diagram form.

FIG. 2 shows an example of an event logging computer system 200 in block diagram form. System 200 can include non-volatile storage 207 and non-volatile non-disk storage 213. The non-volatile storage 207 can be a magnetic optical drive, an optical drive, a DVD RAM or other types of memory systems which maintains large amounts of data even after power is removed from the system. The non-volatile storage 207 can include a boot volume. The non-volatile non-disk storage 213 can be a non-boot volume and can be implemented as, for example, CMOS, flash memory or any type of non-boot memory system that can maintain data even after power is removed from the system. In one embodiment, the non-volatile non-disk storage 213 is implemented using real-time clock (RTC) storage.

System 200 can include identifier manager 221, detector 217, sub-system event monitor 219 and stage manager 215. Computer systems can operate in a sleep mode for power saving purposes. Detector 217 detects activity that triggers a sleep event 203. Examples of sleep event 203 triggers include a user closing the lid of a laptop computer, receiving a user input to activate sleep mode, detecting a user's non-activity for a period of time, etc. Detector 217 can also detect the completion of a wake event 205. The completion of a wake event 205 includes a computer system successfully transitioning out of sleep mode into normal operating mode. Wake events 205 can be trigger by a user opening the lid of a laptop computer, detecting a user's computer activity (e.g., a user can activate an input/output device such as a computer mouse, a keyboard, etc.).

Identifier manager 221 creates a universally unique identifier (UUID). The UUID can be created during a computer system boot. A UUID can also be generated after a computer system has awakened from sleep. The UUID can be stored as identifier data 209 in non-volatile storage 207. For example, the UUID can be written to a preferences file on disk. In one embodiment, the UUID is a numeric value. When detector 217 detects a trigger of a sleep event 203, identifier manager 221 can associate the UUID with the particular sleep event and can store data associating the UUID with the sleep event as identifier data 209. When detector 217 detects the completion of a wake event 205, identifier manager 221 can create a new UUID to also be stored as identifier data 209 in non-volatile storage 207. Identifier manager 221 can associate the new UUID with a subsequent sleep event.

Sub-system event monitor 219 monitors for computer sub-system 223 events that occur after detector 217 detects a sleep trigger 203. Sub-system event monitor 219 can monitor sub-system 223 events occurring through the completion of wake event 205. Computer sub-systems 223 can include and is not limited to power management 225, graphics 227, display 229, device drivers 231, network 233, Windows server 235 and password 237. A number of computer sub-system 223 events can occur when sleep mode is initiated. For example, when a computer system is triggered to enter sleep mode, power management reduces the power consumed by the computer system, network connections turn off, network interfaces turn off, device drivers turn off, etc. A number of computer sub-system 223 events can occur when wake mode is initiated. For example, network interfaces are turned on, network connections are turned on, device drivers are turned on, a password screen is turned on, etc. A computer sub-system 223 can generate one or more messages relating to the sub-system activity occurring in response to the initiation of a sleep event and in response to the initiation of a wake event. For example, power management 225 can be an emergent behavior from hundreds of different of pieces of system code reacting to a sleep event, such that, when a user closes a computer (e.g., laptop computer) lid, a series of power management 225 events occur. Power management 225 sub-system generates a message for each of the power management events that occur.

A message generated by a sub-system 223 can be logged to an event log 211. Event log 211 can be stored in non-volatile storage 207. The UUID stored in identifier data 209 is correlated with each of the computer sub-system 223 messages being logged. Each sub-system 223 (e.g., power management 225, graphics 227, display 229, device drivers 231, network 233, Windows server 235, password 237) can obtain the UUID stored in identifier data 209 from non-volatile storage 207 and associate it with a message generated and logged by the sub-system.

Stage manager 215 monitors the progress of various sub-system 223 events occurring in response to the detection of a sleep event 203 trigger and in response to the initiation of a wake event 205. Stage manager 215 can determine the event stage corresponding to the subsystem event and can store data in non-volatile non-disk storage 213 indentifying which stage is occurring. Examples of event stages include a stage for notifying applications of a detected sleep event, a stage for notifying device drivers of the detected sleep event, a stage for hibernation, a stage for turning the CPU off, a stage for notifying applications of a detected wake event, a stage for turning the CPU on, a stage for exiting hibernation, a stage for notifying device drivers of a detected wake event, a stage for turning device drivers on, a stage for turning applications on, a stage for allocating a screen lock window, a stage for displaying a screen lock window, a stage for requesting a password, a stage for successfully receiving a password, etc.

In one embodiment, the data indentifying which stage is occurring is stored in real time clock storage (e.g., CMOS memory). In one embodiment, the data is stored in CMOS memory using eight bytes of storage. Each sub-system event stage can be represented using a numeric code (e.g., hex number). Stage manager 215 can determine which stage is occurring and store the hex value representing the stage in the CMOS memory 213. For example, stage manager 215 can determine that the current sub-system event stage is turning device drivers on. The corresponding hex value representing the stage of turning the device drivers on can be 22. Stage manager 215 can write the hex value 22 to the CMOS memory 213. Stage manager 215 can detect the next stage occurring and replace the hex value stored in the first byte in CMOS memory 213 with the hex value corresponding to the next stage. For example, stage manager 215 can determine that the next stage occurring is turning applications on which can be represented by hex value 23. Stage manager 215 can replace the hex value 22 representing turning device drivers on in the CMOS memory 213 with the hex value 23 indicating that the current stage is turning applications on. In one embodiment, a hex value of zero represents an "ON" stage where the computer operating system is operating in normal mode (e.g., not in sleep mode). For example, upon a successful completion of wake mode, a computer system is operating in normal operating status and thus, the data stored in the CMOS memory can be a hex value of zero indicating the computer is in an "ON" stage.

Figure 3:
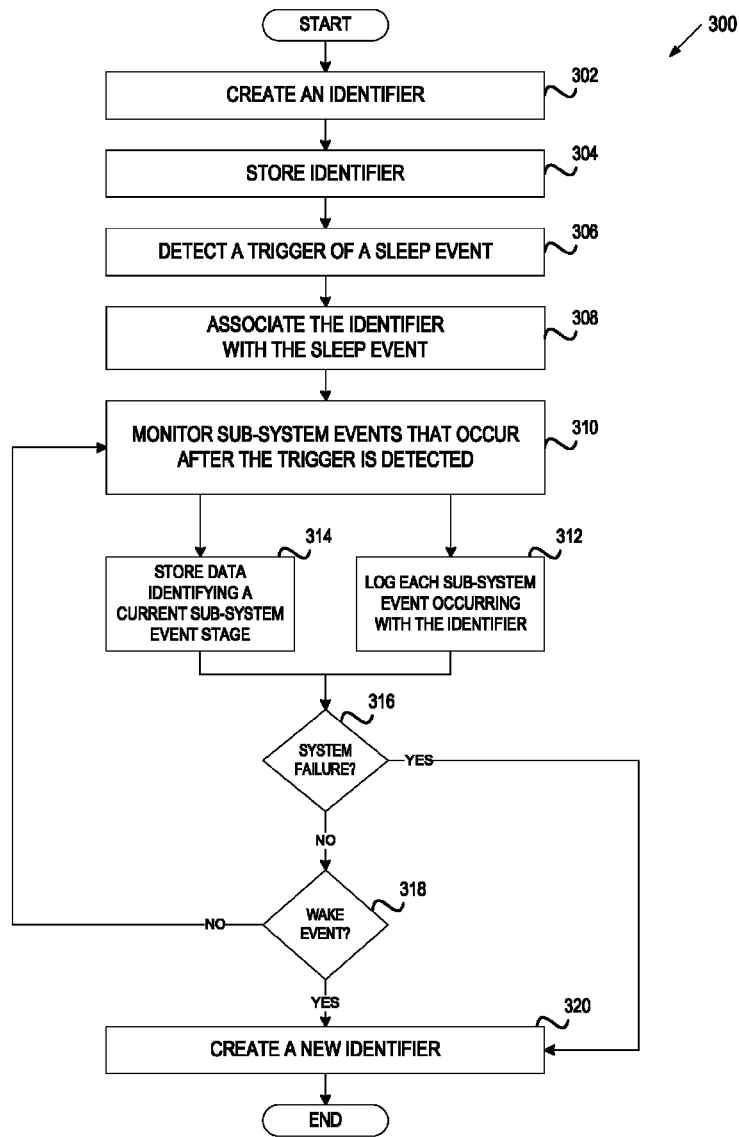
FIG. 3 is a flowchart which illustrates an embodiment of logging events related to a sleep event and a wake event.

FIG. 3 is a flow chart of one embodiment of a method 300 of logging events related to a sleep event and a wake event. At block 302, the method creates a universally unique identifier (UUID). In one embodiment, the UUID is a number. The method 300 can store the UUID in non-volatile storage (e.g., hard disk) at block 304 such that the UUID is made available even after a computer system has powered down. At block 306, the method 300 detects a trigger of a sleep event. Example of triggers of a sleep event include a user closing the lid of a laptop computer, receiving a user input to activate sleep mode, detecting a user's non-activity for a period of time, etc. At block 308, the method associates the UUID with the detected sleep event. The method can store data in non-volatile storage (e.g., hard disk) indicating the association of the UUID to a sleep event. For example, the UUID and data indicating the UUID is associated with a sleep event can be stored in a file on disk.

At block 310, the method monitors sub-system events that occur after the detection of a sleep event trigger, such as events occurring in response to the trigger of the sleep event and events occurring in response to a trigger of a wake event. A computer system can include a number of sub-systems (e.g., sub-systems for power management, graphics, display, device drivers, network, Windows server, password, etc.). The sub-systems can be activated to perform events in response a trigger of sleep mode and in response to a trigger of a wake event. For example, when a computer system is triggered to enter sleep mode, power management reduces the power consumed by the computer system, network connections are turned off, network interfaces are turned off, device drivers are turned off, etc. In an example of when a computer system is triggered to wake (exit sleep mode), sub-system events include events where network connections are turned on, network interfaces are turned on, device drivers are turned on, etc.

At block 312, the method 300 logs each sub-system event using the UUID. Each sub-system can generate one or messages relating to the sub-system activity (event) occurring after a trigger of a sleep event has been detected. For example, a device driver sub-system can generate a message that a particular device driver received notification that sleep mode has been triggered and can generate another message that a particular device driver has been turned off, etc. In another example, a device driver sub-system can generate a message that a particular device driver received notification that a wake event has been triggered and can generate a message that a particular device driver has been turned on, etc. A sub-system can obtain the UUID stored in the non-volatile storage and associate the UUID with a message generated by the sub-system. For example, a device driver sub-system can obtain the UUID from disk, attach the UUID to the message, and store the message with the UUID. A sub-system can store the message associated with the UUID in non-volatile storage (e.g., hard disk). Messages can be stored in one or more log files on disk.

At block 310, the method 300 monitors the progress of various sub-system events that occur after a sleep trigger has been detected and at block 314, the method stores data indentifying which of the sub-system event stages is occurring. Each sub-system event can correspond to a sub-system stage. For example, events for disconnecting network connections and events for shutting down network interfaces can correspond to a stage representing network management. Sub-system event stages are described in greater detail below in conjunction with FIG. 4.

At block 316, the method 300 determines whether the computer system has experienced a system failure. A system failure can manifest as a computer automatically shutting down or a user forcing the computer to shut down. For example, an error (e.g., a sequencing error) may occur while a computer system is entering sleep mode or exiting sleep mode (during wake) such that the computer system may experience a system failure which can result in the computer automatically shutting down due to the error. If the method determines that the computer system did not experience a system failure (block 316), the method 300 determines whether a wake event successfully completed at block 318. For example, the method can determine a completion of a wake event by detecting that a user password was successfully received. If the method 300 determines that a wake event did not successfully complete (block 318), the method returns to block 310 to monitor the sub-system events occurring.

If the method 300 determines that a wake event successfully completed (block 318), the method creates a new identifier at block 320. A computer system may enter and exit more than one sleep mode while the computer system is operating. A universally unique identifier can be assigned to each sleep event and corresponding wake event. For example, a user may turn a computer system on, the method 300 creates a first UUID during the system boot, and the user may work for a few minutes or a few hours before a first sleep event is triggered. After some time, the user may trigger a first wake event. Method 300 logs each of the events related to the first sleep event and the first wake event using the first UUID generated when the computer system was initially powered on. When the computer system exits sleep mode and returns to an "ON" state, method 300 creates a new UUID. The user may work with the computer system in the "ON" state for a few minutes or a few hours before a second sleep event is triggered. After some time, the user may trigger a second wake event. Method 300 logs each of the events related to the second sleep event and the second wake event using the new UUID generated when the computer system completed the first wake event.

If, at block 316, the method determines that the computer system did experience a system failure, the method 300 creates a new universally unique identifier (during a subsequent computer system boot at block 320). The method can store the new UUID in non-volatile storage (e.g., hard disk) and associate the new UUID with a subsequent sleep event. Therefore, each UUID corresponds to a particular sleep event and corresponding wake event.

The sub-system event stage data stored (at block 314) in non-volatile non-disk storage (e.g., non-boot storage such as CMOS memory) may be provided to a user, such that the user can use the data to help debug a system failure which may have occurred while a computer system was entering sleep, in sleep, or awakening from sleep. For example, a system may fail while awakening from sleep and the system may be rebooted (e.g., by a user or automatically). Upon a subsequent boot, the user may see a stage for turning device drivers on from the data stored in the CMOS memory. The user can infer from this data that the computer system failed while the device drivers were being turned on. In addition, the UUIDs, data indicating a UUID is associated with a sleep event, and sub-system event messages tagged with a UUID (event logs) stored in non-volatile storage (e.g. hard disk) may be provided to a user to help a user debug the system failure. When the system was re-booted, the user can see the UUID in a file on disk, use the event logs to see the events tagged with UUID, and determine the sub-system events which have occurred up to the system failure. The user may find that the last sub-system event message logged with this particular UUID is a message generated by a device driver sub-system when the device driver sub-system was turning a particular device driver on. A user can also access the stored data (e.g., sub-system event stage data, UUIDs, data indicating a UUID is associated with a sleep event, and sub-system event messages tagged with a UUID) for statistical analysis.

Figure 4:
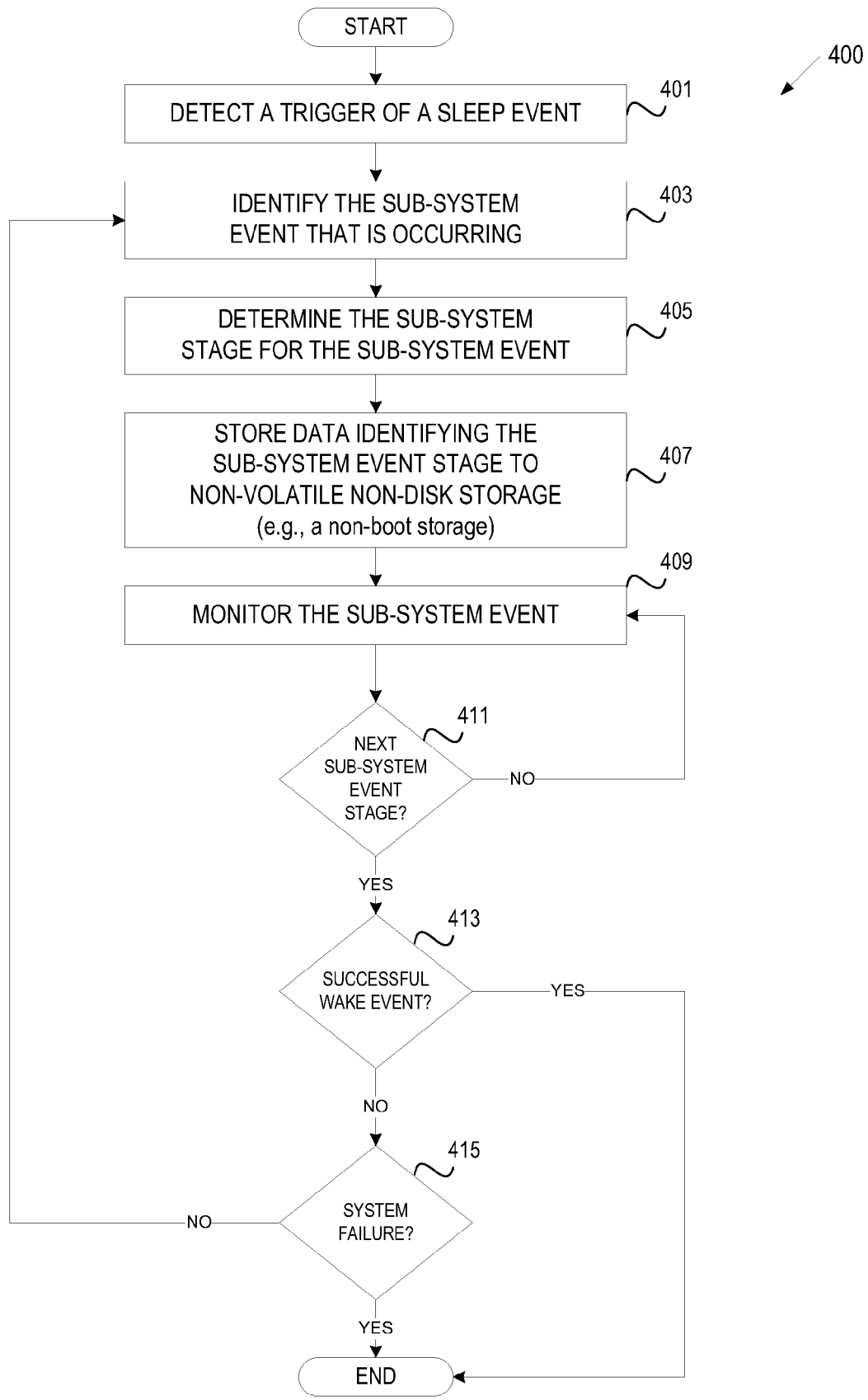
FIG. 4 is a flow chart which illustrates an embodiment of identifying event stages for events related to a sleep event and a wake event.

FIG. 4 is a flow chart of an embodiment of a method 400 for identifying event stages for events related to a sleep event and a wake event. At block 401, the method 400 detects a trigger of a sleep event. At block 403, the method identifies a sub-system event that is occurring. At block 405, the method determines an event stage that corresponds to the sub-system event that is occurring.

At block 407, the method 400 can store data identifying the stage that is occurring in non-volatile non-disk storage (e.g., non-boot storage). For example, the method can store a numeric code in real time clock storage (e.g., CMOS memory). Each sub-system event stage can be represented using a numeric code (e.g., hex number). Method 400 can store a hex value representing the event stage in CMOS memory. For example, method 400 can identify that the current sub-system event stage occurring is turning device drivers on and the corresponding hex value representing the stage of turning the device drivers on may be a hex value of "22." The method 400 can store the hex value "22" in the CMOS memory. In one embodiment, additional data is stored to collect more precise data about the sub-system event stage. For example, additional device driver event stage data can be stored in additional bytes of CMOS memory to track the progress of certain groups of device drivers.

At block 409, the method 400 continues to monitor the sub-system event. At block 411, the method can determine whether a sub-system even stage has completed and the next sub-system event stage has started to occur. For example, the method may determine that the previous stage of turning the device drivers on has completed and that a password sub-system is currently requesting a password from a user. If the method 400 determines the previous stage has not completed and that the next has not started, the method returns to monitoring the sub-system events at block 409. If the method determines that the next sub-system event stage is occurring, the method determines whether a wake event has successfully completed at block 413.

If the method determines a wake event successfully completed at block 413, the method completes. The method can detect a wake event completed by detecting that a password was successfully received. At block 413, if the method 400 determines that a wake event did not successfully complete, the method determines whether the computer system has experienced a system failure at block 415. If the method determines that the computer system has experienced a system failure, the method completes. If the method determines that the computer system has not experienced a system failure, the method returns to identifying the sub-system event at block 403. Using the example above, the method identifies that a password sub-system is currently requesting a password from a user. At block 405, the method determines the sub-system stage corresponding to the sub-system event and stores data identifying the sub-system event stage at block 407. For example, the method can determine the corresponding stage for requesting a password is a password stage. The password stage may have a hex value of "23." In one embodiment, the method 400 replaces the data already stored in non-volatile non-disk storage with the data representing the current stage. For example, the method can write a new numeric code representing the current sub-system stage (e.g., hex value "23" representing password) over a numeric code already stored in memory representing the previous sub-system stage that had occurred (e.g., hex value "22" representing device driver stage).

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method executed in a data processing apparatus comprising:
   detecting a trigger of a sleep event on the data processing apparatus, wherein the data processing apparatus, responsive to the trigger of the sleep event, will begin to enter a low power mode of operation;
   creating an identifier specific to the occurrence of the sleep event, and associating the identifier with the sleep event, the identifier distinguishing the sleep event from the other sleep events;
   monitoring a plurality of system events occurring after detection of the trigger;
   determining whether a wake event completed; and
   logging each of the plurality of system events until a completion of a wake event is detected, wherein each system event is logged using the identifier.

2. The method of claim 1, further comprising:
   creating a new identifier upon determining a wake event completed.

3. The method of claim 1, further comprising:
   monitoring a plurality of system event stages occurring after trigger is detected; and
   storing data in non-volatile non-disk storage identifying which of the plurality of system event stages is occurring.

4. The method of claim 1, wherein logging each of the plurality of system events comprises:
   storing the identifier to non-volatile storage;
   for each of the plurality of system events:
      generating a message;
      obtaining the identifier from the non-volatile storage;
      attaching the identifier to the message; and
      logging the message with the identifier.

5. The method of claim 4, wherein logging the message comprises storing the message to non-volatile storage.

6. The method of claim 1, wherein the plurality of system events comprises events associated with a graphics system, a network, a display, a password, a window, device drivers, and power management.

7. A computer-implemented method comprising:
  detecting a trigger of a sleep event on a data processing system, the sleep event causing the data processing system to attempt to enter a low power mode of operation;
  monitoring a plurality of system event stages occurring after the trigger is detected;
  creating an identifier specific to the occurrence of the sleep event, and associating the identifier with the sleep event, the identifier distinguishing the sleep event from the other sleep events;
  determining whether a wake event completed; and
  writing data identifying a system event stage that is occurring to non-volatile non-disk storage until a completion of a wake event is detected.

8. The method of claim 7, wherein the non-volatile non-disk storage is a CMOS device.

9. The method of claim 7, wherein writing data identifying a system event stage that is occurring comprises:
  writing a numeric code identifying a current system event stage to non-volatile non-disk storage;
  determining a next system event stage is occurring; and
  replacing the numeric code stored in the non-volatile non-disk storage with a numeric code identifying the next system event stage that is occurring.

10. A system comprising:
  a non-volatile storage to store an identifier and a plurality of messages, wherein each message is associated with one of a plurality of system events; and
  at least one processor coupled to the non-volatile storage to detect a trigger of a sleep event, associate an identifier that is specific to the occurrence of the sleep event with the sleep event, the identifier to distinguish the occurrence of the sleep event from other sleep events, monitor a plurality of system events occurring after the detection of the trigger, determine whether a wake event completed, and log each of the plurality of system events occurring using the identifier associated with the sleep event until a completion of a wake event is detected, wherein the system attempts to enter a low power state responsive to the trigger of the sleep event, and wherein the system attempts to enters a normal operating mode upon completion of the wake event.

11. The system of claim 10, further comprising:
  a non-volatile non-disk storage to store data identifying one of a plurality of system event stages; and
  the at least one processor coupled to the non-volatile non-disk storage to monitor the plurality of system event stages and to identify each of the plurality of system event stages.

12. A non-transitory machine-readable storage medium storing instructions which when executed by a data processing system cause the data processing system to perform a method of processing data, the method comprising:
  detecting a trigger of a sleep event, the sleep event to cause the data processing system to perform operations to enter a low power state;
  creating an identifier specific to the occurrence of the sleep event, and associating the identifier with the sleep event, the identifier distinguishing the sleep event from the other sleep events;
  monitoring a plurality of system events occurring after detection of the trigger;
  determining whether a wake event completed; and
  logging each of the plurality of system events until a completion of a wake event is detected, wherein each system event is logged using the identifier, and wherein upon completion of the wake event the data processing system is in a normal operating mode.

13. The machine-readable storage medium of claim 2, further comprising:
  creating a new identifier upon determining a wake event completed.

14. The machine-readable storage medium of claim 12, further comprising:
  monitoring a plurality of system event stages occurring after trigger is detected; and
  storing data in non-volatile non-disk storage identifying which of the plurality of system event stages is occurring.

15. The machine-readable storage medium of claim 12, wherein logging each of the plurality of system events comprises:
  storing the identifier to non-volatile storage;
  for each of the plurality of system events:
    generating a message;
    obtaining the identifier from the non-volatile storage;
    attaching the identifier to the message; and
    logging the message with the identifier.

16. The machine-readable storage medium of claim 15, wherein logging the message comprises storing the message to non-volatile storage.

17. The machine-readable storage medium of claim 12, wherein the plurality of system events comprises events associated with a graphic, a network, a display, a password, a window, device drivers, and power management.

18. A non-transitory machine-readable storage medium storing instructions which, when executed by a data processing system cause the data processing system to perform a method of processing data, the method comprising:
  detecting a trigger of a sleep event;
  creating an identifier specific to the occurrence of the sleep event, and associating the identifier with the sleep event, the identifier distinguishing the sleep event from the other sleep events;
  monitoring a plurality of system event stages occurring after the trigger is detected;
  determining whether a wake event completed, wherein responsive to the completion of the wake event, the data processing system is in a normal operating mode; and
  writing data identifying a system event stage that is occurring to non-volatile non-disk storage until a completion of a wake event is detected.

19. The machine-readable storage medium of claim 18, wherein the non-volatile non-disk storage is a CMOS device, which is not a boot volume.

20. The machine-readable storage medium of claim 18, wherein writing data identifying a system event stage that is occurring comprises:
  writing a numeric code identifying a current system event stage to non-volatile non-disk storage;
  determining a next system event stage is occurring; and
  replacing the numeric code stored in the non-volatile non-disk storage with a numeric code identifying the next system event stage that is occurring.

* * * * *